United States Patent
Fedosovsky et al.

(10) Patent No.: US 9,249,861 B2
(45) Date of Patent: Feb. 2, 2016

(54) TRANSMISSION GEAR, ROLLER REDUCER COMPRISING THE TRANSMISSION GEAR, AND METHOD OF ASSEMBLY THEREOF

(71) Applicant: Zakrytoe aktsionernoe obschestvo <<Diakont>>, Saint Petersburg (RU)

(72) Inventors: Mikhail Evgenievich Fedosovsky, Saint Petersburg (RU); Vadim Igorevich Dunaev, Saint Petersburg (RU); Roman Vladimirovich Pustozerov, Saint Petersburg (RU); Dmitriy Adamovich Anspuk, Saint Petersburg (RU)

(73) Assignee: Diakont Advanced Technologies, Inc., San Diego, CA (US)

( * ) Notice: Subject to any disclaimer, the term of this patent is extended or adjusted under 35 U.S.C. 154(b) by 0 days.

(21) Appl. No.: 14/713,804

(22) Filed: May 15, 2015

(65) Prior Publication Data

US 2015/0267776 A1 Sep. 24, 2015

(30) Foreign Application Priority Data

May 6, 2015 (EA) .................................. 201500520
May 6, 2015 (RU) ................................ 2015117226

(51) Int. Cl.
*F16H 25/22* (2006.01)
*F16H 1/28* (2006.01)
*F16H 57/021* (2012.01)
*F16H 57/08* (2006.01)
*F16H 57/023* (2012.01)

(52) U.S. Cl.
CPC .......... *F16H 1/2863* (2013.01); *F16H 25/2252* (2013.01); *F16H 57/021* (2013.01); *F16H 57/023* (2013.01); *F16H 57/08* (2013.01); *Y10T 29/49465* (2015.01)

(58) Field of Classification Search
None
See application file for complete search history.

(56) References Cited

U.S. PATENT DOCUMENTS

| | | | |
|---|---|---|---|
| 3,640,150 A | | 2/1972 | Leiner et al. |
| 4,037,893 A | * | 7/1977 | Perrin ........................... 384/550 |
| 4,721,016 A | | 1/1988 | Burandt |
| 4,742,730 A | | 5/1988 | Dorn et al. |
| 4,751,855 A | | 6/1988 | Hudson et al. |
| 4,932,613 A | | 6/1990 | Tiedeman et al. |
| 5,779,587 A | | 7/1998 | Reilly |
| 6,093,009 A | * | 7/2000 | Jacks, Jr. .................... 418/201.1 |
| 6,554,734 B1 | | 4/2003 | Maydew |
| 6,783,478 B2 | | 8/2004 | Larson |

(Continued)

FOREIGN PATENT DOCUMENTS

SU 1294606 A 3/1987

*Primary Examiner* — Justin Holmes
(74) *Attorney, Agent, or Firm* — Frommer Lawrence & Haug LLP (57) ABSTRACT

The present invention relates to a roller reducer comprising a transmission gear having an externally threaded shaft having at least one left-handed thread portion, at least one right-handed thread portion, and at least one shaft flange ring, and a plurality of rollers, each roller having a plurality of thread portions, comprising at least one left-handed thread portion and at least one right-handed thread portion, each thread portion arranged to engage with the respective thread portions of the shaft, and at least one roller flange ring arranged adjacent to the roller thread portions to rotationally slide against the corresponding at least one flange ring of the shaft.

Diameters of the flange rings of the rollers and the flange rings of the shaft are each equal to the respective effective thread diameters of the engaged thread portions of the rollers and the shaft, respectively.

16 Claims, 3 Drawing Sheets

(56) References Cited

U.S. PATENT DOCUMENTS

| | | |
|---|---|---|
| 6,875,145 B2 | 4/2005 | McKay et al. |
| 7,100,870 B2 | 9/2006 | Flatt |
| 7,201,700 B2 | 4/2007 | Buxton |
| 7,600,297 B2 | 10/2009 | Gitnes |
| 7,651,436 B2 * | 1/2010 | Sugitani ........................ 475/342 |
| 8,814,748 B2 * | 8/2014 | Osterlanger et al. .......... 475/333 |
| 2003/0100398 A1 | 5/2003 | McKay et al. |
| 2005/0277513 A1 | 12/2005 | Larson |

* cited by examiner

TRANSMISSION GEAR, ROLLER REDUCER COMPRISING THE TRANSMISSION GEAR, AND METHOD OF ASSEMBLY THEREOF

FIELD OF THE INVENTION

The present invention relates to planetary gears for transmitting rotational movement, in particular to planetary gear reducers with stepped threaded rollers.

BACKGROUND OF THE INVENTION

Roller reducers are a subset of planetary reducers and can be used for adjusting torque and as a rotation/linear motion converters. In particular, roller reducers can be used in robots, manipulators and power drives requiring transmission of large amounts of torque under size restrictions. Such reducers have the following advantages: simple design and few components; high kinematic accuracy provided by a short kinematic chain and many contact points; smooth and low-noise operation; small dimensions while providing high transmitted torque; and operation at high input shaft rotation velocities.

Inventor's Certificate SU 1294606 discloses a manipulator joint formed by a roller reducer; the joint comprises a threaded shaft and threaded rollers forming a planetary gear, and first and second members comprising nuts, wherein the first member is formed by a fork embracing the second member. First member nuts are engaged with the roller threads, which in turn are engaged with the shaft threads, and second member nuts are engaged with the output roller threads. According to SU 1294606, play is eliminated in all thread engagements in said manipulator joint by pressing the reducer members together.

A disadvantage of SU 1294606 is that the rollers tend to bend in the central or proximal part thereof along the shaft upon transmitting high torque, which leads to a shift of contact points towards thread edge and to edge contact, leading to a decreased load-bearing capacity of the reducer, greater slip and worse efficiency.

Further, SU 1294606 disadvantageously prevents from providing a play-free transmission because pressing together nuts of each of the members, to allegedly eliminate play in thread interfaces, can cause slip of the rollers, and the play will persist.

Thus, it is an object of the present invention to provide a transmission gear and a roller reducer comprising fewer components, but presenting stable characteristics across the whole load range, and a wide range of gear ratios obtained by adjusting parameters of reducer elements without adding and removing extra elements.

Furthermore, it is an object of the present invention to increase load-bearing capabilities and efficiency of the reducer, and to provide play-free transmission.

A further object of the present invention is to provide a method for faultless assembly of the reducer at minimum labor cost.

SUMMARY OF THE INVENTION

In one embodiment, a transmission gear comprises an externally threaded shaft having at least one left-handed thread portion, at least one right-handed thread portion, and at least one shaft flange ring, and
 a plurality of rollers, each roller having
 a plurality of thread portions, comprising at least one left-handed thread portion and at least one right-handed thread portion, each thread portion arranged to engage with the respective thread portions of the shaft, and
 at least one roller flange ring arranged adjacent to the roller thread portions to rotationally slide against the corresponding at least one flange ring of the shaft.

Diameters of the flange rings of the rollers and the flange rings of the shaft are each equal to the respective effective thread diameters of the engaged thread portions of the rollers and the shaft, respectively.

According to one embodiment, each roller has a plurality of roller flange rings arranged between each two adjacent roller thread portions, and the shaft comprises a plurality of shaft flange rings corresponding to the roller flange rings.

According to one embodiment, the shaft has one left-handed thread portion, one right-handed thread portion, and at least one shaft flange ring. Each of the thread portions is arranged distal at a corresponding end of the shaft, while the flange ring is arranged proximal between the thread portions at the central section of the shaft.

Advantageously, the inventive gear mechanism comprising said flange rings eliminates, at least in part, bending of the rollers and the shaft.

Further advantages include: (1) lessening shift of thread contact points towards thread edge, (2) lessening edge contact leading to a decrease in load-bearing capacity of the reducer, (3) lessening slip, and (4) increasing efficiency.

Furthermore, due to the fact that diameters of the flange rings are equal to effective thread diameters of the engaged thread portions of the rollers and the shaft, respectively, the roller flange rings slide against the shaft flange rings with no essential slip, thus increasing efficiency of the transmission gear and reducing wear of the gear, which operates with minimal frictional loss.

In another embodiment, a roller reducer comprises
 a first reducer member comprising at least two first reducer member nuts, each having an inner thread portion, and fixedly mounted with respect to each other;
 a second reducer member comprising at least two second reducer member nuts, each having an inner thread portion, and fixedly mounted with respect to each other;
 and a transmission gear comprising
 an externally threaded shaft having at least one left-handed thread portion, at least one right-handed thread portion, and at least one shaft flange ring, and
 a plurality of rollers, each roller having
 a plurality of thread portions, comprising at least one left-handed thread portion and at least one right-handed thread portion, each thread portion arranged to engage with the respective thread portions of the shaft, and
 at least one roller flange ring arranged adjacent to the roller thread portions to rotationally slide against the corresponding at least one flange ring of the shaft.

Diameters of the flange rings of the rollers and the flange rings of the shaft are each equal to the respective effective thread diameters of the engaged thread portions of the rollers and the shaft, respectively, The at least two roller thread portions, which are engaged with the respective shaft thread portions, are arranged to engage with the inner thread portions of one of said member nuts, and
 the other of the at least two roller thread portions are engaged with inner nut threads of the other of said members.

In said roller reducer, due to said transmission gear and due to provision of the flange rings between each two adjacent roller thread portions and corresponding shaft flange rings, load within the roller reducer can be partially redistributed in radial direction from the thread to the flange rings, which allows to decrease load in thread interfaces and to increase efficiency of the reducer, as well as service life of individual reducer parts and the reducer in general.

By substantial eliminating bending of the rollers and the shaft due to provision of the flange rings, and due to the fact that diameters of the flange rings of both the rollers and the shaft are equal to effective thread diameters of the engaged thread portions of the rollers and the shaft, respectively, the present roller reducer operates more efficiently, thus increasing service life of individual parts and the reducer in general. The present reducer provides a range of gear ratios only by adjusting parameters of reducer elements without adding and removing extra elements. In particular, the present roller reducer provides high gear ratios of up to several thousand.

According to one embodiment of the reducer, the thread portions of each of the nuts, the shaft and the rollers are preloaded.

In yet another embodiment of the reducer, the shaft can be disassembled and comprises at least two parts, each part comprising at least one thread portion.

According to another aspect of the present invention, a method of assembling the roller reducer is provided, wherein the shaft cannot be disassembled. The method comprises the steps of:

a) providing at least one positioning device comprising positioning elements for engaging rollers, said positioning elements configured to block displacement of the rollers with respect to each other when the positioning elements engage with the rollers, wherein each of the positioning elements has a configuration different from any other of the positioning elements;

b) providing rollers, wherein each of the rollers comprises a complementary element for engaging the positioning device, said element having a configuration complementary to the configuration of one of the positioning elements of the positioning device;

c) mounting the shaft and the rollers into said at least one positioning device, d) engaging the roller complementary elements with the positioning elements of corresponding configuration, thus unambiguously positioning the rollers with respect to each other and to the shaft;

e) mounting nuts onto proximal thread portions of the rollers, providing engagement between said nut threads and the corresponding roller thread portions;

f) mounting nuts onto distal thread portions of the rollers, providing engagement between said nut threads and the corresponding roller thread portions;

g) disengaging the complementary elements of the rollers from the positioning elements;

h) fixedly mounting the first member nuts with respect to each other, and fixedly mounting the second member nuts with respect to each other.

According to another aspect of the present invention, a method of assembling the roller reducer is provided, wherein the shaft can be disassembled. The method comprises the steps of:

a) providing at least one positioning device comprising positioning elements for engaging rollers, said positioning elements configured in such manner that the rollers can be mounted therein longitudinally with respect to each other along the circumference, and adapted to limit displacement of each of the rollers between an inner radial position and an outer radial position, wherein each of the positioning elements has a configuration different from configuration of any other of the positioning elements;

b) element rollers, wherein each of the rollers comprises a complementary element for engaging the positioning device, said element having a configuration complementary to the configuration of one of the positioning elements in the positioning device;

c) mounting the shaft and the rollers into said at least one positioning device, and engaging the roller complementary elements with the positioning elements of corresponding configuration, thus positioning each of the rollers in the inner radial position;

d) mounting the nuts and displacing the rollers radially to the outer radial position, thus engaging threads of said nuts with the corresponding proximal thread portions of the rollers;

e) engaging the shaft thread portions with the corresponding roller thread portions and fixing the shaft thread portions with respect to each other;

f) mounting the nuts to provide engagement between said nut threads and distal thread portions of the rollers;

g) disengaging the complementary elements of the rollers from the positioning elements;

h) fixedly mounting the first member nuts with respect to each other, and fixedly mounting the second member nuts with respect to each other.

According to the methods, the rollers are conveniently arranged around the shaft at respective angular positions. Further, in operation, the rollers advantageously maintain their positions due to maintaining distances between axis of each roller and axis of the shaft and due to maintaining angle between adjacent rollers.

BRIEF DESCRIPTION OF THE DRAWINGS

Following is the detailed description of specific embodiments of the present invention with reference to accompanying drawings, wherein.

DETAILED DESCRIPTION

Figure 1:
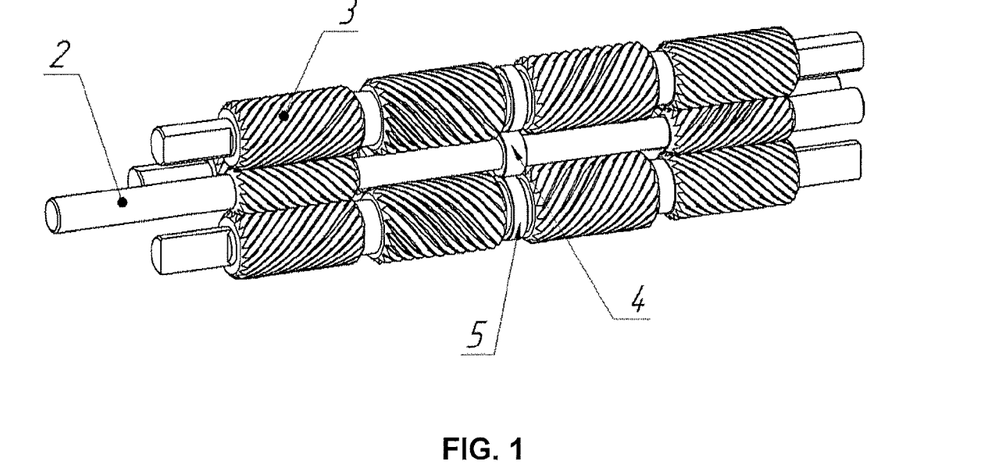
FIG. 1 shows the transmission gear according to one embodiment of the present invention.

According to one embodiment shown in FIG. 1, transmission gear 1 comprises an externally threaded shaft 2 and four rollers 3 arranged around the shaft 2.

The shaft 2 serves as an input high-velocity member of the transmission gear 1. As shown in FIG. 1, the shaft 2 comprises a left-handed thread portion and a right-handed thread portion. The portions have threads of the same diameter. The thread portions are arranged distally at distal sections of the shaft. In other embodiments, however, these thread portions can be arranged proximally in the center of the shaft 2. In further embodiments, the shaft 2 can comprise more than two thread portions.

In one embodiment shown in FIG. 1, the shaft 2 comprises a flange ring 4 arranged in the central part thereof. In other embodiments, however, e.g. when the shaft thread portions are arranged in the center of the shaft, the shaft can comprise at least two flange rings arranged at distal sections thereof. Diameter of the flange ring 4 is equal to effective diameter of the thread in the shaft 2.

In the embodiment shown in FIG. 1, each of the rollers 3 comprises two pairs of thread portions, wherein one pair of thread portions is arranged in the central part of the rollers 3, and the other pair of thread portions is arranged at distal sections of rollers 3, wherein threads of each pair of thread portions have identical diameters, but mutually different directions. In this embodiment, the thread of roller portions is symmetrical with respect to the plane perpendicular to roller axis and passing through the center thereof. The pair of distal thread portions is a pair of input or support portions arranged at distal sections of rollers 3 and engaged with thread portions of the shaft 2, thus transmitting input torque from the shaft 2 to the rollers 3. The pair of proximal thread portions is a pair of output portions and is used to transmit output torque. It should be noted that in other embodiments, thread portions of one pair can alternate with thread portions of the other pair. Further, it should be noted that in other embodiments, each of the rollers can comprise more than four thread portions.

According to the embodiment shown in FIG. 1, each roller 3 has a flange ring 5 arranged between the proximal thread portions of the rollers 3. Further, as shown in FIG. 1, the flange ring 4 of the shaft 2 is arranged in such manner that it abuts or slides against the flange rings 5 of the rollers 3. Diameters of flange rings 5 are equal to effective thread diameters of portions of the rollers 3 engaging thread portions of the shaft 2.

In the embodiment shown in FIG. 1, the flange rings 4 and 5 supports the roller so as to substantially eliminate bending of roller in the roller reducer while transmitting high loads. Furthermore, diameters of the flange rings 4 and 5 of the shaft 2 and rollers 3 are chosen equal to effective thread diameters of corresponding portions of the shaft 2 and rollers 4 to provide rotational sliding of the roller flange rings against the shaft flange rings without slip, thus reducing or eliminating frictional losses.

It should be noted that in other embodiments, the shaft thread portions are arranged in the center of the shaft, and the roller thread portions arranged in the center in engagement with the respective shaft thread portions to transmit input torque from the shaft to the rollers, wherein rollers comprise at least two flange rings arranged at distal sections of the rollers on the outer side with respect to the distal thread portions.

In one embodiment, to prevent the shaft 2 from rolling out of the plurality of rollers 3, the lead angles of shaft 2 portions are equal in degree and opposite in direction with respect to lead angles of roller 3 portions engaged therewith. The opposite thread directions at different portions of the shaft 2 and the opposite thread directions at different portions of the rollers 3 prevent rollers 3 from slipping along turns of shaft 2 thread.

In other embodiments, the roller flange rings can be arranged on the rollers in all the gaps between thread portions as well as on the outer side with respect to distal thread portions. In this configuration, shaft flange rings are formed on the shaft at portions corresponding to portions bearing the roller flange rings. This embodiment provides partial redistribution of load within the roller reducer, said load directed in a radial direction towards the screw axis, from the shaft towards said flange rings, thus reducing radial force in thread interface and increasing efficiency of the reducer as well as service life of individual parts and the reducer in general.

Figure 2:
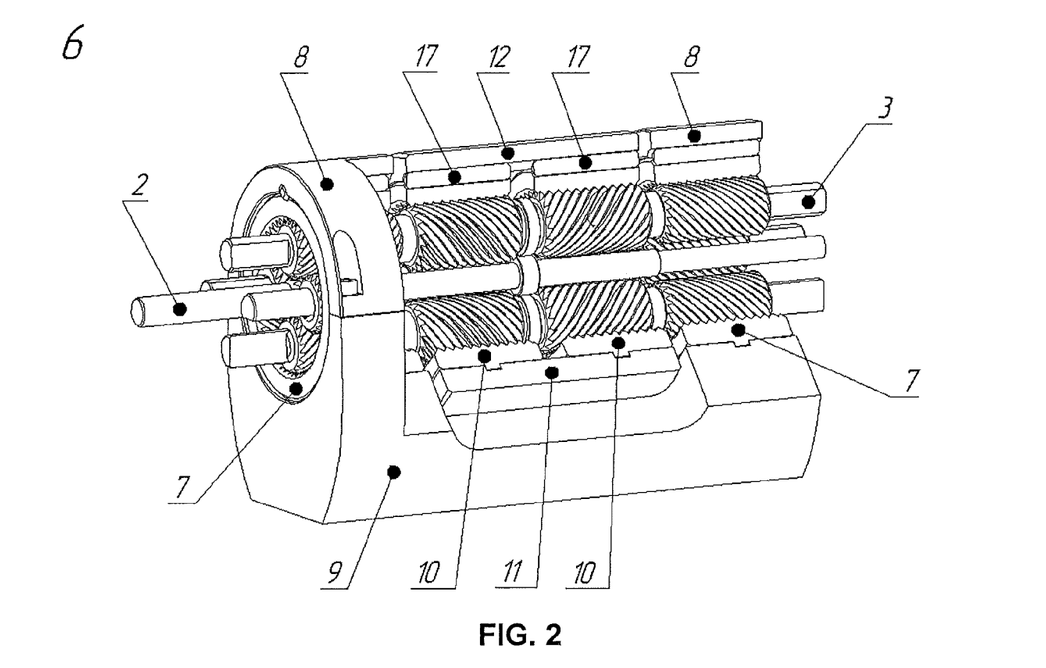
FIG. 2 shows an assembled roller reducer according to one embodiment of the present invention.

FIG. 2 shows the roller reducer 6 in assembly according to one embodiment of the present invention. The roller reducer 6 comprises an input member, an output member, and the transmission gear 1 described above.

The input, or support, member comprises two nuts 7 mounted fixedly in linear and angular direction by means of fixture 8 within a stationary body 9 without possible displacement and rotation with respect to body 9 and each other. The nuts 7 are engaged with the roller 3 input thread portions.

The output member comprises two nuts 10 mounted fixedly in linear and angular direction with respect to each other by means of fixtures 11 and 12. The nuts 10 are engaged with the roller 3 output portions.

In the embodiment shown in FIG. 2, to prevent the rollers 3 from rolling out of nuts 7 and 10, the lead angles of roller 3 portions are equal in degree and opposite in direction with respect to lead angles of thread of nuts 7 and 10 engaged therewith. The opposite thread directions at different portions of the rollers 3 prevent rollers from slipping along turns of thread of nuts 7 and 10.

It should be noted that, in this embodiment, nut threads in each member must be oriented in such way that they precisely mirror each other with respect to the vertical plane of symmetry of the reducer. In other words, start of both nuts in each member must be arranged at the same rotational position.

In the embodiment shown in FIG. 2, to properly orient the nuts with respect to each other, and to prevent nuts 7 from slipping in fixture 8 and body 9 and nuts 10 in fixtures 11 and 12, the roller reducer is provided with fixating or orienting elements, in this embodiment formed by keys 17 inserted into specifically arranged grooves in the body 9 and fixtures 8, 11 and 12, as well as in nuts 7 and 10. Furthermore, to preclude axial displacement of nuts 7 in fixture 8 and body 9 and of nuts 10 in fixtures 11 and 12, circular grooves are arranged in body 9 and fixtures 8, 11 and 12, whereas abutment flanges are arranged on nuts 7 and 10. However, other variants of nut 7 and 10 fixation will be apparent to those skilled in the art; such fixation can be achieved, e.g., by means of pins, splined joint, etc. to prevent slip, and by means of key joint, pins, etc. to prevent axial displacement. It should be noted that for assembly of the roller reducer, angles between the start of the thread in the shaft and the orienting element arranged on the nut must be equal.

In this embodiment, play-free transmission between rollers 3 and nuts 7 and 10 is achieved by preloading threads thereof. Preloading involves selecting the effective diameter of the screw, rollers and nuts in such manner that the sum of effective diameters of the screw and two rollers is greater than the effective diameter of the corresponding nut by a value corresponding to the required preloading. In the present invention, preloading can be arranged using any suitable method known in the art.

Figure 4:
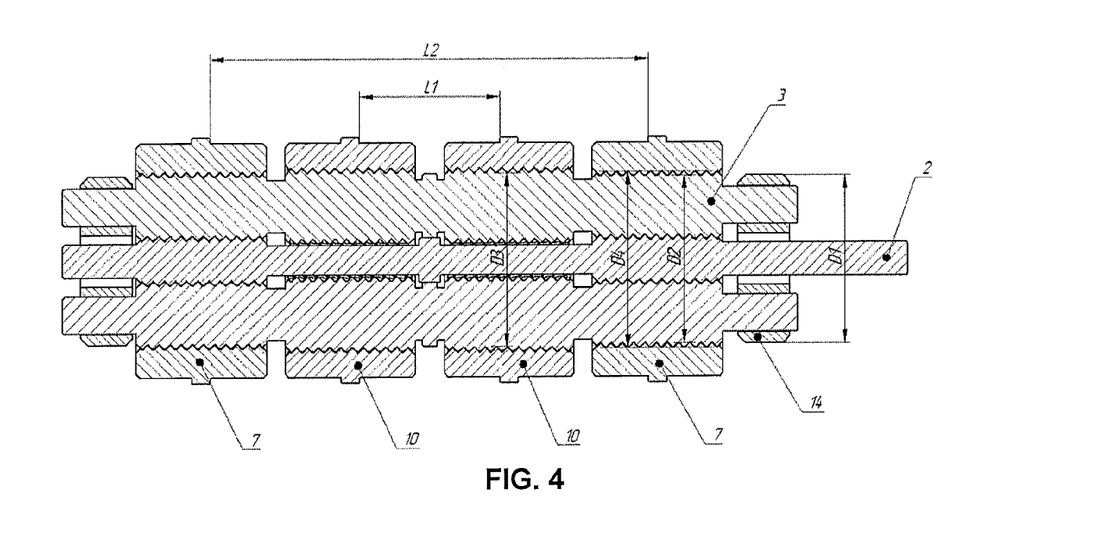
FIG. 4 shows the roller reducer according to one embodiment of the present invention during assembly with the positioning device shown in FIG. 3 mounted thereon.

In one embodiment the roller reducer is designed to have the inner diameter D3 (see FIG. 4) of the thread crests of nuts 10 of the output member, which is greater than the outer diameter D4 (see FIG. 4) of the thread grooves of nuts 7 of the input member, while the reducer shaft is formed as a single part.

In another embodiment, the roller reducer is designed to have diameter D3, which is smaller than diameter D4, and in this case the shaft must be disassemblable, as described in greater detail below. Depending on ratios between diameters D3 and D4, the method of assembly of a roller reducer (described in greater detail below) will be different.

Figure 5:
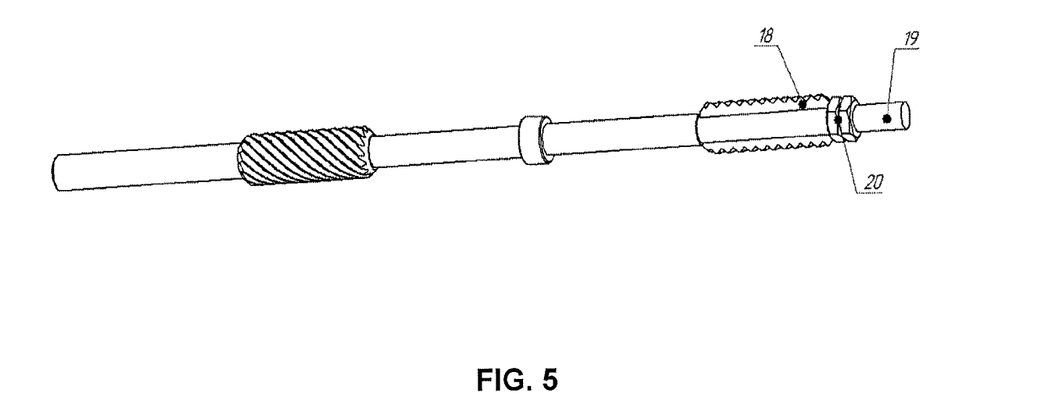
FIG. 5 shows an embodiment of the shaft of the roller reducer, wherein the shaft can be disassembled.

As mentioned above, in the embodiment where diameter D3 is smaller than diameter D4, the shaft 2 is configured disassemblable, e.g. comprising two parts 18, 19, wherein each of said parts comprises a thread portion (see FIG. 5). Further, according to the invention, the shaft can comprise more than two component parts. Such arrangement significantly facilitates assembly of the roller reducer, as described in greater detail below.

In one embodiment of the roller reducer according to the present invention, where the difference between starts of nut threads of the output member and starts of nut threads of the input, or support, member is aliquant to the number of rollers, each roller is unique. One roller differs from the other by the thread rotation angle of the output portion with respect to the thread of the input portion of the roller. Said unique property of each roller defines the only possible variation of roller reducer arrangement with unique relative position of the rollers. Furthermore, when assembling the reducer, the rotation angle of the roller with respect to its axis (which is unique for each roller) and the roller mounting sequence are also of importance. In case of any deviation from said relative position, angle of rotation or the roller mounting sequence, the roller reducer would be impossible to assemble.

Following is the detailed description of the method of assembly of the roller reducer according to the above embodiment describing the roller reducer, wherein the inner diameter D3 of the thread crests of nuts 10 of the output member is greater than the inner diameter D4 of the thread grooves of nuts 7 of the input member.

Figure 3:
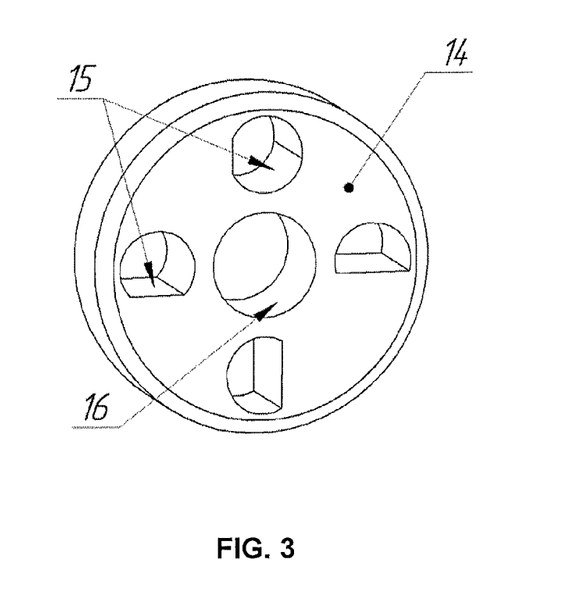
FIG. 3 shows the positioning device according to one embodiment of the present invention.

In one embodiment, to provide the required mounting sequence and the required angular position of rollers 3 during assembly of the roller reducer, the rollers must be fixated with respect to each other, including fixation of the rotation angle. Said fixation can be provided by means of a specific positioning device. FIG. 3 shows the positioning device 14 according to one embodiment of the present invention.

According to this embodiment, the positioning device 14 comprises centering openings 15 used for installing rollers 3. Openings 15 are arranged at a distance equal to the interaxial distance between the shaft 2 and rollers 3 from the central opening 16 used for mounting the screw 2, and are evenly spaced. A blind segment is arranged in each centering opening 15; the configuration of said segment differs from configurations of blind segments in other centering openings 15. Furthermore, a complementary patch is arranged at the end of each roller 3 in such manner that the section of the roller with the patch has a shape complementary to the corresponding centering opening 15, thus providing precise orientation of rollers 3 with respect to each other when mounted into the positioning device 14. It should be noted that the outer diameter (D1 in FIG. 4) of the positioning device 14 must be smaller than inner diameters (D3 and D2) of nuts 7 and 10 to allow for mounting the nuts 7 and 10 via the positioning device 14.

It should be noted that in other embodiments of the present invention, the positioning device can have a different configuration, e.g., instead of centering openings it can comprise protrusions, and rollers in this case comprise openings on ends thereof complementary to the protrusions on the positioning device.

In the embodiment, where diameter D3 is greater than diameter D4, the positioning device comprises positioning elements configured for engaging with the roller and configured for blocking roller displacement with respect to each other when the positioning elements engage with the rollers. Further, each positioning element has a configuration differing from the configurations of other positioning elements. Furthermore, each roller comprises a complementary element for engaging the positioning device, said element having a configuration complementary to the configuration of one of the positioning elements of the positioning device.

According to the present embodiment of the method, the screw 2 is installed into the central opening 16 of the positioning device 14. Then rollers 3 are sequentially installed into centering openings 15 of the positioning device 14 in such manner that, due to the presence of patches on rollers 3 and blind segments in centering openings 15, a fixed orientation of rollers 3 with respect to each other and to the screw 2 is achieved. In other words, the fixed orientation of rollers 3 with respect to each other and to the screw 2 is achieved by means of the positioning device 14.

Then, nuts 10 of the output member are mounted onto the inner, or proximal, thread portions of the (output) rollers 3. In this embodiment, when the reducer gear ratio is low and the inner diameter (D3) of the thread crests of nuts 10 is greater than the inner diameter (D4) of the thread grooves of nuts 7, nuts 10 of the output member can pass over support thread portions of the rollers 3 freely, and can be mounted onto the output portions of the rollers 3.

When mounting nuts 10 at the output portion of rollers 3, a distance (see FIG. 4) is provided between abutment flanges of nuts 10, said distance being equal to the distance between circular grooves of the fixtures 11 and 12. In this case, key grooves of nuts 10 are arranged in one plane in order to provide precise positioning of nuts with respect to each other using the key, at least to maintain start symmetry in the threads of two nuts with respect to the plane perpendicular to the roller axis and passing through the center point thereof.

Then nuts 7 are mounted onto the outer, or distal, thread portions of the rollers 3, which form input, or support, thread portions. When mounting nuts 7 on the input, or support, portion of rollers 3, a distance L2 (see FIG. 4) is provided between abutment flanges of nuts 7, said distance being equal to the distance between circular grooves of the fixture 8 and the body 9. In this case, key grooves of nuts 7 are arranged in one plane to provide precise positioning of nuts with respect to each other using the key, at least to maintain start symmetry in the threads of two nuts with respect to the plane perpendicular to the roller axis and passing through the center point thereof.

After mounting nuts 7 and 10 onto the rollers 3, the positioning device 14 is removed from the rollers 3. In other embodiments, the positioning device can be removed from the rollers 3 after mounting at least one nut.

Then keys 17 are mounted onto the nuts 7 and 10 of the input, or support, member and the output member of the roller reducer. Then fixtures 11 and 12 are mounted onto the nuts 10 of the output member of the reducer and fixated with respect to each other. Key 17 and abutment flanges of nuts 10 provide precise positioning of the fixtures 11 and 12 on the nuts 10 of the output member with respect to each other. Keys 17 prevent rotation of the nuts 10 in opposite directions and at different velocities, and abutment flanges provide distance L1 (see FIG. 4).

Then nuts 7 of the input, or support, member are mounted into the fixture 8 and the body 9, after which the fixture 8 and the body 9 are fixated with respect to each other. Key 17 and abutment flanges of nuts 7 provide precise positioning of the fixture 8 and the body 9 on the nuts 7 of the input member with respect to each other. Keys 17 prevent rotation of the nuts 7 in opposite directions and rotation thereof at different velocities, and the abutment flanges provide distance L2 (see FIG. 4).

In the embodiment, where the inner diameter D3 of the thread crests of nuts 10 of the output member is smaller than the inner diameter D4 of the thread grooves of nuts 7 of the input member, and the shaft must be disassemblable, the method of assembly will differ from the described method of assembly with respect to the embodiment wherein diameter D3 is greater than diameter D4.

In this embodiment, the positioning device comprises positioning elements configured for engagement with the rollers and configured to block the roller rotation about their axes when the positioning elements are engaged with the rollers; however, said elements lack the possibility of blocking radial displacement of rollers changing the interaxial distance from minimum to nominal. In this case, the positioning device comprises positioning elements for engaging rollers, said elements configured in such manner that the rollers can be mounted therein longitudinally with respect to each other along the circumference, and adapted to limit displacement of each roller to displacement between a radially inner position and a radially outer position, wherein each positioning element has a configuration different from the configurations of other positioning elements. For example, positioning elements can be formed by centering openings having an elongated shape and providing radial displacement of the rollers with respect to the axis of the positioning device. Furthermore, said centering openings also block roller rotation about their axis, e.g. analogous to the positioning device 14, by means of blind segments.

According to one embodiment of the method, the rollers 3 are first installed into the positioning device in such manner that the rollers are positioned in a radially inner position in centering openings of the positioning device. Thus, due to the presence of patches on the rollers 3 and blind segments in the centering openings, a fixed orientation of the rollers 3 in an axial direction with respect to each other is achieved. Then nuts 10 of the output member are mounted, and the rollers 3 are displaced to the radially outer position, wherein nut 10 threads engage with the corresponding proximal thread portions of the rollers 3 (in this embodiment, said rollers are output rollers).

Then, two parts 18 and 19 of the shaft 2 are simultaneously screwed in on different sides of the reducer between rollers 2 installed during the previous step in such manner that thread portions of shaft parts engage with the input, or support, thread portions of the rollers 3; then, two parts of the shaft are fixedly mounted with respect to each other, e.g. by means of a nut 20 or another fastener.

Then, nuts 7 of the support member are mounted onto the rollers 3 in such manner that nut 7 threads engage with the corresponding outer, or distal, thread portions of the rollers 3 (in this embodiment, said rollers are input, or support, rollers).

The following steps are performed according to the method of assembly of a reducer with low gear ratios, as described above.

The roller reducer according to one embodiment of the present invention is operated as follows.

Rotation is transmitted to the reducer via the shaft 2 shown in FIG. 2 (high speed shaft). When rotating, the shaft 2 transmits rotary torque to rollers 3 by means of threaded engagement. The rollers 3 roll over the stationary nut 7 and take on a specific velocity of rotation about axis of the shaft 2 an about its own axis, similarly to the process in a planetary mechanism, wherein the outer gearwheel is stationary, and the inner gearwheel rotates.

Due to the fact that the threads on nuts 7 and nuts 10 differ in diameter and number of starts, thread parameters of distal portions and proximal portions of the rollers 3 are different. When rotating at a certain angular velocity, the roller 3 has different linear velocities at points located at the diameter of the proximal thread portions and at points located at the diameter of the distal thread portions. The differential of said velocities is transmitted to nuts 10.

When the torque is transmitted from the high speed shaft (shaft 2) to the low speed shaft (nuts 10), the force is transferred via thread rollers 3. The force vector on the thread can be resolved into an axial component and a radial component. The axial component of force stretches or squeezes rollers 3, and the radial component bends rollers 3. The rollers 3 can also be bent by an external radial force acting upon the shaft 2 or the nuts 10.

The flange rings reduce bending of the rollers 3 due to effect of the radial component of force.

Although the present invention is described herein in its specific embodiments, various changes and modifications can be made thereto without departing from spirit and scope of the present invention, as defined in the appended claims.

The invention claimed is:

1. A transmission gear comprising:
   an externally threaded shaft having at least one left-handed thread portion, at least one right-handed thread portion, and at least one shaft flange ring,
   a plurality of rollers, each roller having
      a plurality of thread portions, comprising at least one left-handed thread portion and at least one right-handed thread portion, each thread portion arranged to engage with the respective thread portion of the shaft, and
      at least one roller flange ring arranged adjacent to the at least one roller thread portion to rotationally slide against the corresponding at least one flange ring of the shaft,
   wherein the diameter of the at least one shaft flange ring is equal to the effective thread diameter of the thread portions of the shaft, and
   wherein the diameter of the at least one roller flange ring is equal to the effective thread diameters of the thread portions of the roller.

2. The transmission gear according to claim 1,
   wherein the shaft comprises one left-handed thread portion and one right-handed thread portion, the portions being arranged distally at distal sections of the shaft, and
   each roller of the plurality of rollers comprising two pairs of thread portions, wherein one pair of thread portions comprises one left-handed thread portion and one right-handed thread portion, the thread portions being arranged proximally in the central part of the roller, and the other pair of thread portions comprise one left-handed thread portion and one right-handed thread portion, the thread portions being arranged at distal sections of the roller to engage with said distal thread portions of the shaft, and
   wherein the at least one shaft flange ring is arranged between said distal thread portions of the shaft to rotationally slide against the respective at least one flange ring of each of the rollers.

3. The transmission gear according to claim 1,
   wherein the shaft comprises one left-handed thread portion and one right-handed thread portion, the thread portions being arranged proximally in the center of the shaft, and
   each roller of the plurality of rollers comprising two pairs of thread portions, wherein one pair of thread portions comprises one left-handed thread portion and one right-handed thread portion, the thread portions being arranged at distal sections of the roller, and the other pair of thread portions comprises one left-handed thread portion and one right-handed thread portion, the thread portions being arranged proximally in the central part of the roller to engage with said proximal thread portions of the shaft, and wherein the shaft has at least two flange rings arranged at distal sections thereof and adjacent to said proximal shaft thread portions to rotationally slide against the respective flange rings of the rollers.

4. The transmission gear according to claim 1, wherein the diameter of the at least one left-handed thread portion of each roller is equal to the diameter of the at least one left-handed thread portions of the shaft, and wherein the diameter of the at least one right-handed thread portion of each roller is equal to the diameter of the at least one right-handed thread portions of the shaft.

5. The transmission gear according to claim 1, wherein the diameter of the at least one left-handed thread portion of each roller is smaller than the diameter of the at least one left-handed thread portions of the shaft, and wherein the diameter of the at least one right-handed thread portion of each roller is smaller than the diameter of the at least one right-handed thread portions of the shaft.

6. The transmission gear according to claim 1, wherein each roller has a plurality of roller flange rings arranged between each two adjacent roller thread portions, and the shaft has a plurality of shaft flange rings corresponding to the roller flange rings.

7. A roller reducer comprising:
a first reducer member comprising at least two first reducer member nuts, each having an inner thread portion, and fixedly mounted with respect to each other;
a second reducer member comprising at least two second reducer member nuts, each having an inner thread portion, and fixedly mounted with respect to each other;
and a transmission gear comprising
an externally threaded shaft having at least one left-handed thread portion, at least one right-handed thread portion, and at least one shaft flange ring, and
a plurality of rollers, each roller having
a plurality of thread portions, comprising at least one left-handed thread portion and at least one right-handed thread portion, each thread portion arranged to engage with the respective thread portions of the shaft, and
at least one roller flange ring arranged adjacent to the roller thread portions to rotationally slide against the corresponding at least one flange ring of the shaft,
wherein the diameter of the at least one shaft flange ring is equal to the effective thread diameter of the thread portions of the shaft, and
wherein the diameter of the at least one roller flange ring is equal to the effective thread diameters of the thread portions of the roller, and
wherein the at least two roller thread portions, which are engaged with the respective shaft thread portions, are arranged to engage with the inner thread portions of one of said member nuts, and
the other of the at least two roller thread portions are engaged with inner nut threads of the other of said members.

8. The roller reducer according to claim 7,
wherein the shaft comprises one left-handed thread portion and one right-handed thread portion, the portions being arranged distally at distal sections of the shaft, and
each roller of the plurality of rollers comprising two pairs of thread portions, wherein one pair of thread portions comprises one left-handed thread portion and one right-handed thread portion, the thread portions being arranged proximally in the central part of the roller, and the other pair of thread portions comprises one left-handed thread portion and one right-handed thread portion, the thread portions being arranged at distal sections of the roller to engage with said distal thread portions of the shaft, and wherein the at least one shaft flange ring is arranged between said left-handed thread portion of the shaft and said right-handed thread portion of the shaft to rotationally slide against the respective at least one flange ring of each of the rollers.

9. The roller reducer according to claim 7,
wherein the shaft comprises one left-handed thread portion and one right-handed thread portion, the thread portions being arranged proximally in the center of the shaft, and
each roller of the plurality of rollers comprises two pairs of thread portions, wherein one pair of thread portions comprises one left-handed thread portion and one right-handed thread portion, the thread portions being arranged proximally in the central part of the roller, and the other pair of thread portions comprises one left-handed thread portion and one right-handed thread portion, the thread portions being arranged at distal sections of the roller to engage with said proximal thread portions of the shaft, and
wherein the shaft has at least two flange rings arranged at distal sections thereof and adjacent to said proximal shaft thread portions to rotationally slide against the respective flange rings of the rollers.

10. The roller reducer according to claim 7, wherein the diameter of the at least one left-handed thread portion of each roller is equal to the diameter of the at least one left-handed thread portions of the shaft, and wherein the diameter of the at least one right-handed thread portion of each roller is equal to the diameter of the at least one right-handed thread portions of the shaft.

11. The roller reducer according to claim 7, wherein the diameter of the at least one left-handed thread portion of each roller is smaller than the diameter of the at least one left-handed thread portions of the shaft, and wherein the diameter of the at least one right-handed thread portion of each roller is smaller than the diameter of the at least one right-handed thread portions of the shaft.

12. The roller reducer according to claim 7, wherein each roller has a plurality of roller flange rings arranged between each two adjacent roller thread portions, and the shaft has a plurality of shaft flange rings corresponding to the roller flange rings.

13. The roller reducer according to claim 7, wherein the thread portions of each of the nuts, the shaft and the rollers are preloaded.

14. The roller reducer according to claim 7, wherein the shaft is disassemblable and comprises at least two parts, each part comprising at least one thread portion.

15. A method of assembling the roller reducer according to claim 7, comprising the steps of:
providing at least one positioning device comprising positioning elements for engaging rollers, said positioning elements configured to block displacement of the rollers with respect to each other when the positioning elements engage with the rollers, wherein each of the positioning elements has a configuration different from configuration of any other of the positioning elements;
providing rollers, wherein each of the rollers comprises at least one left-handed thread portion and at least one right-handed read portion, the thread portions being arranged distally at distal sections of the roller, and at least one left-handed thread portion and at least one right-handed thread portion, the thread portions being arranged proximally in the central part of the roller, and wherein each of the rollers comprises a complementary element for engaging the positioning device, said element having a configuration complementary to the configuration of one of the positioning elements in the positioning device;

mounting the shaft and the rollers into said at least one positioning device, engaging the roller complementary elements with the positioning elements of corresponding configuration, thus unambiguously positioning the rollers with respect to each other and to the shaft, mounting nuts onto said proximal thread portions of the rollers, providing engagement between said nut threads and said proximal thread portions;

mounting nuts onto said distal thread portions of the rollers, providing engagement between said nut threads and said distal thread portions;

disengaging the complementary elements of the rollers from the positioning elements;

fixedly mounting the first member nuts with respect to each other, and fixedly mounting the second member nuts with respect to each other.

16. A method of assembling the roller reducer according to claim 14, comprising the steps of:

providing at least one positioning device comprising positioning elements for engaging rollers, said positioning elements configured in such manner that the rollers can be mounted therein longitudinally with respect to each other along the circumference, and adapted to limit displacement of each of the rollers between an inner radial position and an outer radial position, wherein each of the positioning elements has a configuration different from configuration of any other of the positioning elements;

providing rollers, wherein each of the rollers comprises at least one left-handed thread portion and at least one right-handed thread portion, the thread portions being arranged distally at distal sections of the roller, and at least one left-handed thread portion and at least one right-handed thread portion, the thread portions being arranged proximally in the central part of the roller, and wherein each of the rollers further comprises a complementary element for engaging the positioning device, said element having a configuration complementary to the configuration of one of the positioning elements in the positioning device;

mounting the shaft and the rollers into said at least one positioning device, and engaging the roller complementary elements with the positioning elements of corresponding configuration, thus positioning each of the rollers in the inner radial position, mounting the nuts and displacing the rollers radially to the outer radial position, thus engaging threads of said nuts with said proximal thread portions of the rollers;

engaging the shaft thread portions with the corresponding roller thread portions and fixing the shaft thread portions with respect to each other;

mounting the nuts to provide engagement between said nut threads and said distal thread portions of the rollers;

disengaging the complementary elements of the rollers from the positioning elements;

fixedly mounting the first member nuts with respect to each other, and fixedly mounting the second member nuts with respect to each other.

* * * * *